United States Patent [19]

Kuroda

[11] Patent Number: 5,161,033
[45] Date of Patent: Nov. 3, 1992

[54] APPARATUS FOR PLAYING VIDEO SIGNAL RECORDING MEDIUM

[75] Inventor: Kazuo Kuroda, Tokorozawa, Japan

[73] Assignee: Pioneer Electronic Corporation, Tokyo, Japan

[21] Appl. No.: 651,605

[22] Filed: Feb. 6, 1991

[30] Foreign Application Priority Data

Jul. 16, 1990 [JP] Japan .................................. 2-187675

[51] Int. Cl.⁵ .......................... H04N 5/94; H04N 9/87
[52] U.S. Cl. ..................................... 358/336; 358/312; 358/314
[58] Field of Search ...................... 358/312, 314, 336; 360/38.1, 10.1, 10.3

[56] References Cited

U.S. PATENT DOCUMENTS

| | | | |
|---|---|---|---|
| 4,577,237 | 3/1986 | Collins | 358/336 |
| 4,635,134 | 1/1987 | Sasamura et al. | 358/314 |
| 4,814,897 | 3/1989 | Kojima et al. | 358/338 |

Primary Examiner—Donald McElheny, Jr.
Attorney, Agent, or Firm—Fish & Richardson

[57] ABSTRACT

A video signal recording medium playing apparatus having a field memory is disclosed. When switching from a special reproducing mode to a noise reducing mode, a phase difference between a reference vertical sync signal and a read vertical sync signal is detected and a period of the reference vertical sync signal is increased or decreased. When the phase differences coincide, the mode switching is performed, thereby preventing a fluctuation of an image upon mode switching.

4 Claims, 10 Drawing Sheets

WHEN N = 10

| PRESET VALUE OF P.C.34 | COUNT VALUE OF U/D.C. | INTEGRATION VALUE | HALF VALUE | PHASE DIFFERENCE |
|---|---|---|---|---|
| 262 | 0 | 0 | 5 | 10 |
| 262 | 1 | 1 |   | 10 |
| 261 | 2 | 3 |   | 9 |
| 260 | 3 | 6 |   | 7 |
| 260 | 3 | 9 |   | 5 |
| 261 | 2 | 11 |   | 4 |
| 261 | 2 | 13 |   | 3 |
| 261 | 2 | 15 |   | 2 |
| 261 | 2 | 17 |   | 1 |
| 261 | 2 | 19 | ↓ | 0 |

Fig. 3B

WHEN N = 7

| THE NUMBER OF REFH SIGNALS | PRESET VALUE | INTEGRATION VALUE | HALF VALUE | PHASE DIFFERENCE |
|---|---|---|---|---|
| 262 | 0 | 0 | 3 | 6 |
| 262 | 1 | 1 | ↓ | 6 |
| 261 | 2 | 3 | | 5 |
| 261 | 2 | | | 3 |
| 261 | 2 | | | 1 |
| 261 | 2 | | | 0 |

Fig. 4A MODE SWITCHING COMMAND (SPECIAL) (NOISE REDUCTION)

Fig. 4B PBV

Fig. 4C REF

Fig. 4D PHASE DIFFERENCE

Fig. 4E SLIP-START

Fig. 4F PHASE DIFFERENCE DETECTION

Fig. 4G OUTPUT OF UP/DOWN COUNTER

Fig. 4H THE NUMBER OF REFH SIGNALS

Fig. 4I OUTPUT OF PHASE COINCIDENCE DETECTING CIRCUIT

Fig. 4J (SLIP ABSENCE SIGNAL)

APPARATUS FOR PLAYING VIDEO SIGNAL RECORDING MEDIUM

BACKGROUND OF THE INVENTION

1. Field of the Invention

The present invention relates to a video signal recording medium playing apparatus for playing a recording medium such as a video disk or the like on which a video signal has been recorded.

2. Description of the Related Art

Figure 1:
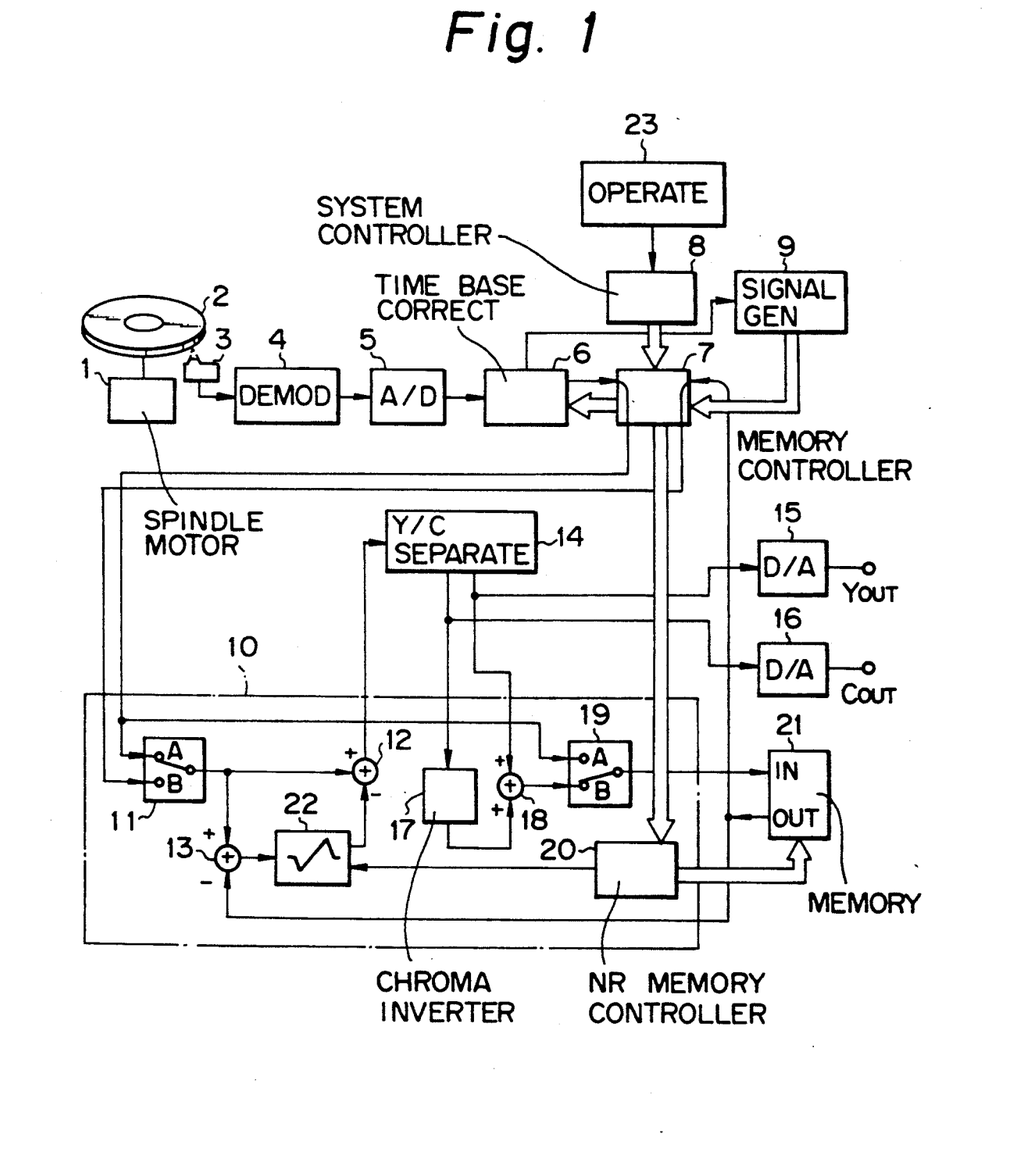
FIG. 1 is a block diagram showing a prior art example.

In recent years, a video disk playing apparatus which commonly uses an image memory so as to execute two functions has been developed as an apparatus for playing a recording medium on which a video signal (what is called a composite video signal) is recorded. The above apparatus will now be described with reference to FIG. 1. In FIG. 1, while a video disk 2 is rotated by disk rotating means including a spindle motor 1, a carrier signal having a video signal (which assumes an NTSC signal here) recorded on the video disk 2 is obtained by a pickup 3 which is positioned in the radial direction of the disk 2. A demodulator 4 obtains the original video signal by demodulating the carrier signal. An A/D converter 5 converts the original video signal into the digital signal and supplies to a time base correcting circuit 6. A memory controller 7 executes a time base correction by writing and reading out the digital signal in cooperation with a system controller 8 synchronously with a reference vertical sync signal and a reference horizontal sync signal (hereinafter, abbreviated to REFV and REFH, respectively) which are generated from a signal generator 9. The digital video signal which was transmitted through the memory controller 7 is supplied to one fixed contact A of a switch 11 of a noise reducing circuit 10.

The system controller 8 controls the operation in the normal reproducing mode (hereinafter, referred to as a noise reducing mode or the special reproducing mode to search, scan, or the like in accordance with a mode designation command from a manual operation section 23 such as a keyboard or the like.

Now, assuming that the noise reducing mode has been set, a movable contact of the switch 11 is connected to the fixed contact A side as shown in the diagram by a command from the system controller 8. Therefore, the digital video signal is supplied to input terminals of subtracters 12 and 13 through the switch 11. An output of the subtracter 12 is supplied to a Y/C separator 14, by which the digital video signal is separated into a luminance component and a chrominance component. The luminance component signal is supplied to a D/A converter 15 and is output as an analog luminance signal and is supplied to a display driving section (not shown). The chroma component signal is supplied to a chroma inverter 17 and a D/A converter 16 and is output as an analog chrominance signal and is supplied to the display driving section. The chroma inverter 17 inverts the phase of the chrominance component every on a 2-field unit basis, that is, every other frame on the basis of field information from the memory controller 7. The chrominance component which is issued from the chroma inverter 17 is supplied to one input terminal of an adder 18. The luminance component from the Y/C separator 14 is supplied to the other input terminal of the adder 18 and is again synthesized with the chrominance component is supplied to a switch 19.

A movable contact of the switch 19 is connected to a fixed contact B side by the system controller 8 in the noise reducing mode. Therefore, an output of the adder 18 is transmitted through the switch 19, and is written into a field memory (hereinafter, simply referred to as a memory) 21 while excluding the playback V sync (simply referred to as PBV hereinafter) because of cooperation between the memory controller 7 and an NR controller 20, so as to save the memory capacity of the memory 21.

On the contrary, when reading out of the memory 21, a reference V sync (simply referred to as REFV hereinafater), is inserted in place of the PBV. In the noise reducing mode, the PBV is given as a reset signal from the time base correcting circuit 6 to the signal generator 9, so that the phases of the REFV and PBV are coincident with each other.

The one-field preceding video signal which has been read out from the memory 21 is supplied to the subtracter 13 and a subtraction is executed between the one-field preceding video signal and the video signal which is supplied from the memory controller 7. Although the phase of the chrominance component in the NTSC video signal is inverted every frame, the phase of the chrominance component has been inverted every other frame as mentioned above. Therefore, the phases of the chrominance components in the one-field preceding video signal and the video signal of the present field which are used for the subtraction coincide with each other.

A difference signal resulted from the subtraction is supplied to a non-linear circuit 22. In the noise reducing mode, an operation command is supplied from the NR memory controller 20 to the non-linear circuit 22 and the noises are reduced in accordance with the level of the difference. On the other hand, when the difference level is equal to or higher than a predetermined level, the difference is considered to be caused by a motion in a video image bt not the noise components, so that the noise reducing operation is stopped. Such a process is performed by using a fact that as the noises in the displayed video image are visually conspicuous as the motion in the video image is small, that is, the level of the video signal difference of a field unit is small. Therefore, the noise reducing operation can be executed without sacrificing the motion information in the video image. Such a noise reducing operation has already been well known by Japanese Patent Publication No.62-3639. Therefore, its detailed description is omitted.

An output of the non-linear circuit 22 is supplied to the subtracter 12 and the noise-reduced video signal is emitted from the subtracter 12 and is supplied to the Y/C separator 14.

Now, assuming that the operating mode has been set to the special reproducing mode accompanied with a jumping operation such as fast forward operation, search operation, or the like, the movable contact of the switch 11 is connected to the fixed contact B side and the movable contact of the switch 19 is connected to the fixed contact A side. Therefore, the digital video signal which was transmitted through the memory controller 7 is sequentially written into the memory 21 through the switch 19. When, in this case, video data are written into the memory 21, the memory controller 7 sets the head of the data to the head address in a predetermined storage area in the memory 21. When, a jumping operation is executed during playing of a CLV disk in which the phases of the V and H sync signals are not coincident with each other in the radial direction, the video data are sequentially read out from the head addresses and the REFV and REFH are inserted, thereby to produce a video signal representing images without disturbances.

The memory controller 7 checks continuity of subcarrier of the video signal which is read out of the memory 21 and executes a proper correction if necessary and supplies the signal to the B contact of the switch 11. In the special reproducing mode, an operation stop command is generated from the NR controller 20 to the non-linear circuit 22 and the noise reducing operation is not executed. Therefore, the digital video signal which is transmitted through the switch 11 is supplied to the Y/C separator 14 without being influenced by any signal in the subtracter 12.

When, in the above prior art, the operating mode is shifted from the noise reducing mode to the special reproducing mode, the memory 21 executes the sync converting operation and the V sync signal of the video signal which is read out is REFV. Therefore, any disturbances in the image does not occur even if the image is displayed. When, however shifting from the special reproducing mode to the noise reducing mode, the subtracter 13 compares the present video signal synchronized with the RBV and the one-field preceding video signal which is the output of the memory 21 and is synchronized with the REFV, thereby obtaining the difference between them. When, therefore there is a remarkable phase deviation between the PBV and the REFV as in the case of playing a CLV disk, the displayed reproduction image fluctuates largely.

SUMMARY OF THE INVENTION

It is, therefore, an object of the invention to provide a video signal recording medium playing apparatus which has a field memory and executes the operations in both of the normal reproducing mode and the special reproducing mode, the apparatus being able to reproduce a clear image even upon change of modes.

According to the present invention, there is provided a video signal recording medium playing apparatus comprising: reading means for driving a recording medium on which an information signal carrying thereon a video signal has been recorded, for reading out the information signal and demodulating the read signal so as to obtain the video signal, and thereafter for digitalizing the video signal, thereby sequentially obtaining pixel data; memory means which can store the pixel data of at least one field in the video signal; signal generating means for generating a reference horizontal and vertical sync signals in response to a reset signal; first control means for sequentially writing the present value of the pixel data into the memory means and correcting the present value by the preceding pixel data of one field period before under a normal reproducing mode and for reading out the pixel data of at least one field from the memory means on the basis of the reference horizontal and vertical sync signals under a special reproducing mode; second control means for causing the first control means to take either one of the modes in accordance with a mode designation command; and output means for converting the digital video signal which is obtained from the first control means into the analog video signal and supplying the analog video signal to the succeeding stage, wherein the second control means comprises first detecting means for detecting a phase difference between the reproduction vertical sync signal which is obtained from the video signal just after a mode designation command is generated and the reference vertical sync signal, second detecting means for producing a phase coincidence signal when the phase difference lies within a predetermined range, pull-in means for gradually reducing or increasing a generation interval of the reset signal when the phase coincidence signal is absent, for thereafter gradually increasing or reducing such a generation interval, for producing the reset signal, and for executing a vertical pull-in control, and switching instructing means for instructing the mode switching to the first control means when the phase coincidence signal was received during the vertical pull-in control.

In the video signal recording medium playing apparatus according to the present invention, a phase difference between the reproduction vertical sync signal and the reference vertical sync signal is detected when a command is given thereto for upon switching between the normal reproducing mode and the special reproducing mode. When the video signal data is read out of the field memory on the basis of the reference vertical sync signal, the generation period of the reference vertical sync signal is gradually reduced or increased as long as the phase difference is out of the predetermined range. Thereafter, it is again increased or reduced, the reproducing mode is actually switched when the phase difference falls within the predetermined range.

DETAILED DESCRIPTION OF THE PREFERRED EMBODIMENTS

An embodiment of the invention will be described in detail hereinbelow with reference to FIGS. 2A to 6C.

Figure 2A:
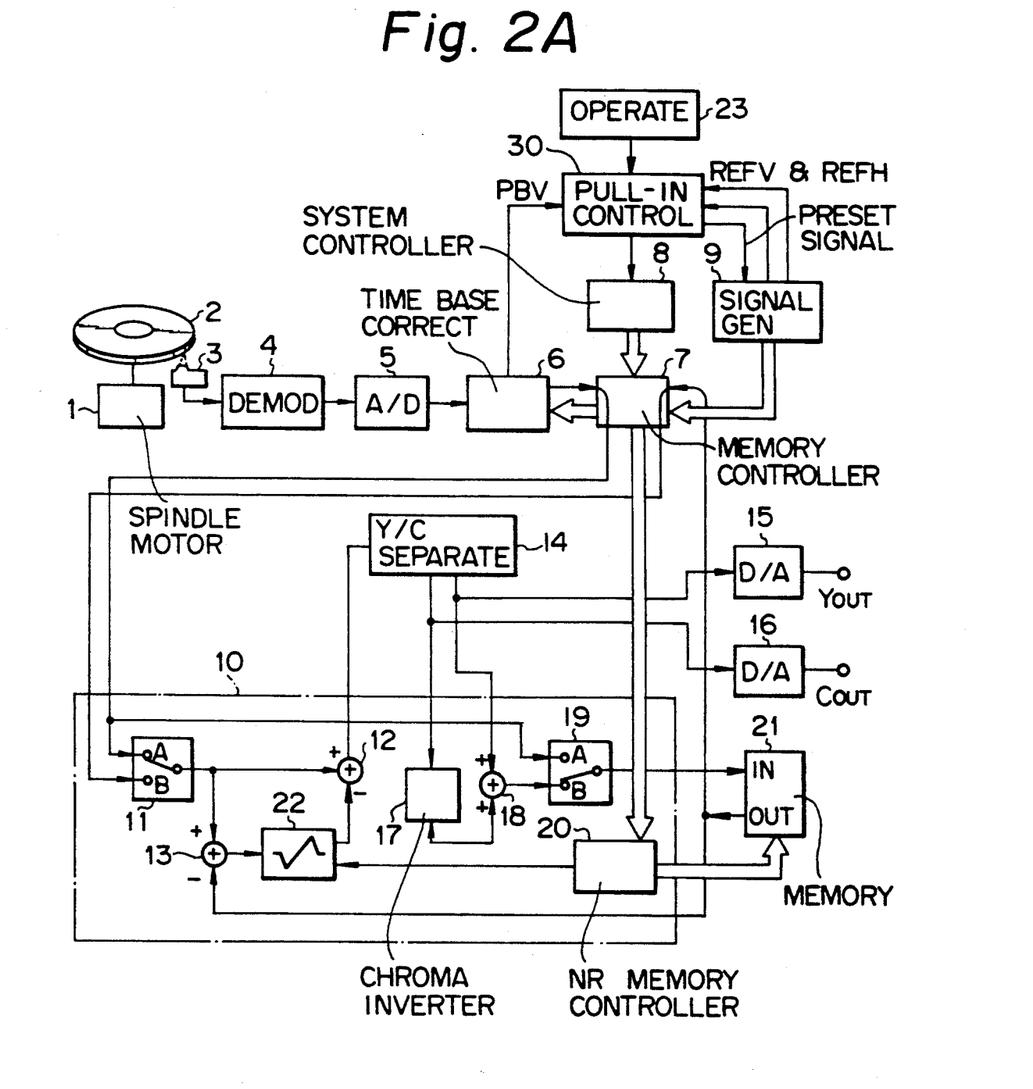
FIG. 2A is a block diagram showing a whole construction of an embodiment of the invention.
Figure 6:
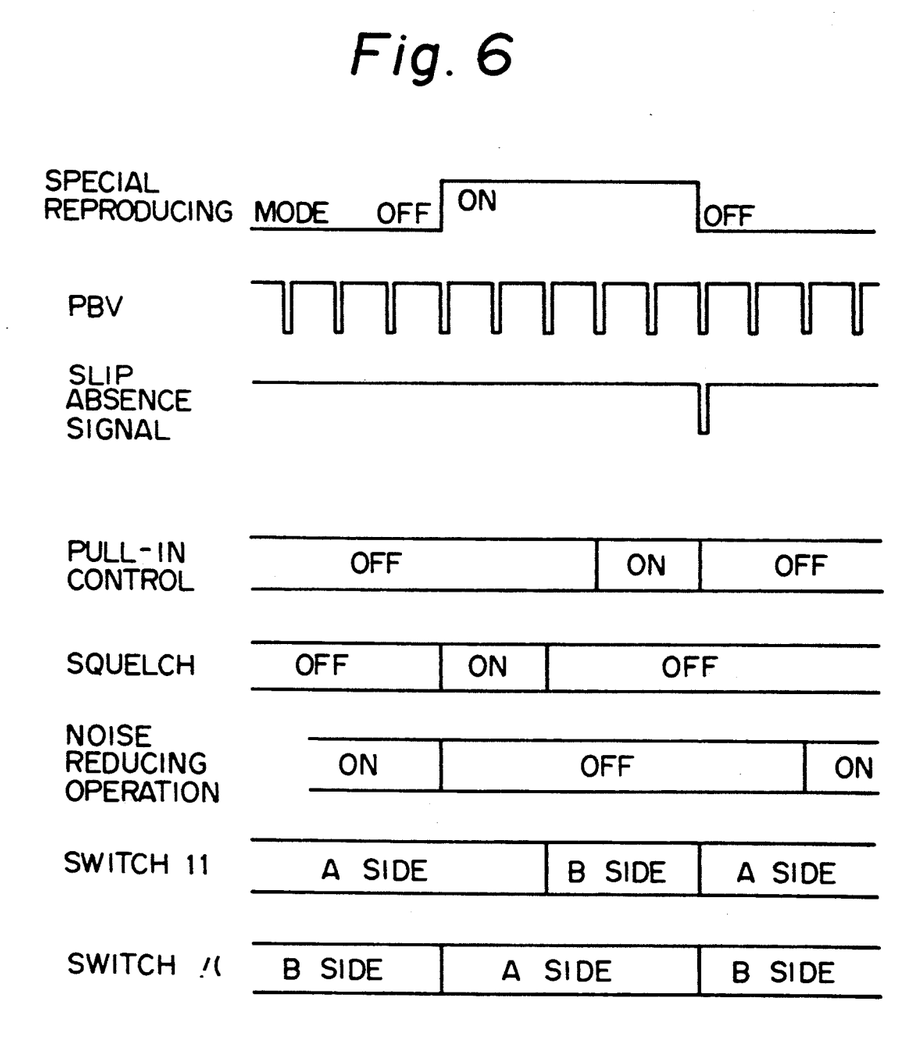
FIG. 6 is an operation timing chart in the embodiment of the invention.

In FIG. 2A, a circuit arrangement formed by the spindle motor 1 through the non-linear circuit 22 is substantially the same as that in the prior art of FIG. 6 except the manual operation section 23 and the signal generator 9. The embodiment differs from the prior art with respect to a point that a vertical pull-in control circuit (hereinafter, abbreviated to a pull-in control circuit) 30 is newly provided.

A mode designation command from the manual operation section 23 is supplied to the pull-in control circuit 30. Various operation commands other than the mode designation command are supplied from the manual operation section 23 to the system controller 8. On the other hand, the PBV from the time base control circuit 6 is supplied to the pull-in control circuit 30. The reset signal to the signal generator 9 is given from the pull-in control circuit 30. The REFV and REFH which are generated in response to the reset signal as a trigger signal are supplied to the memory controller 7 and pull-in control circuit 30. On the other hand, the reset signal is supplied from the pull-in control circuit 30 to the signal generator 9. The switching signal is supplied from the pull-in control circuit 30 to the system controller 8. Therefore, the mode designation command from the manual operation section 23 is supplied to the system controller 8 through the pull-in control circuit 30, so that the noise reducing operation is executed or stopped and the switching control operations of the switches 11 and 19 are performed.

Figure 2B:
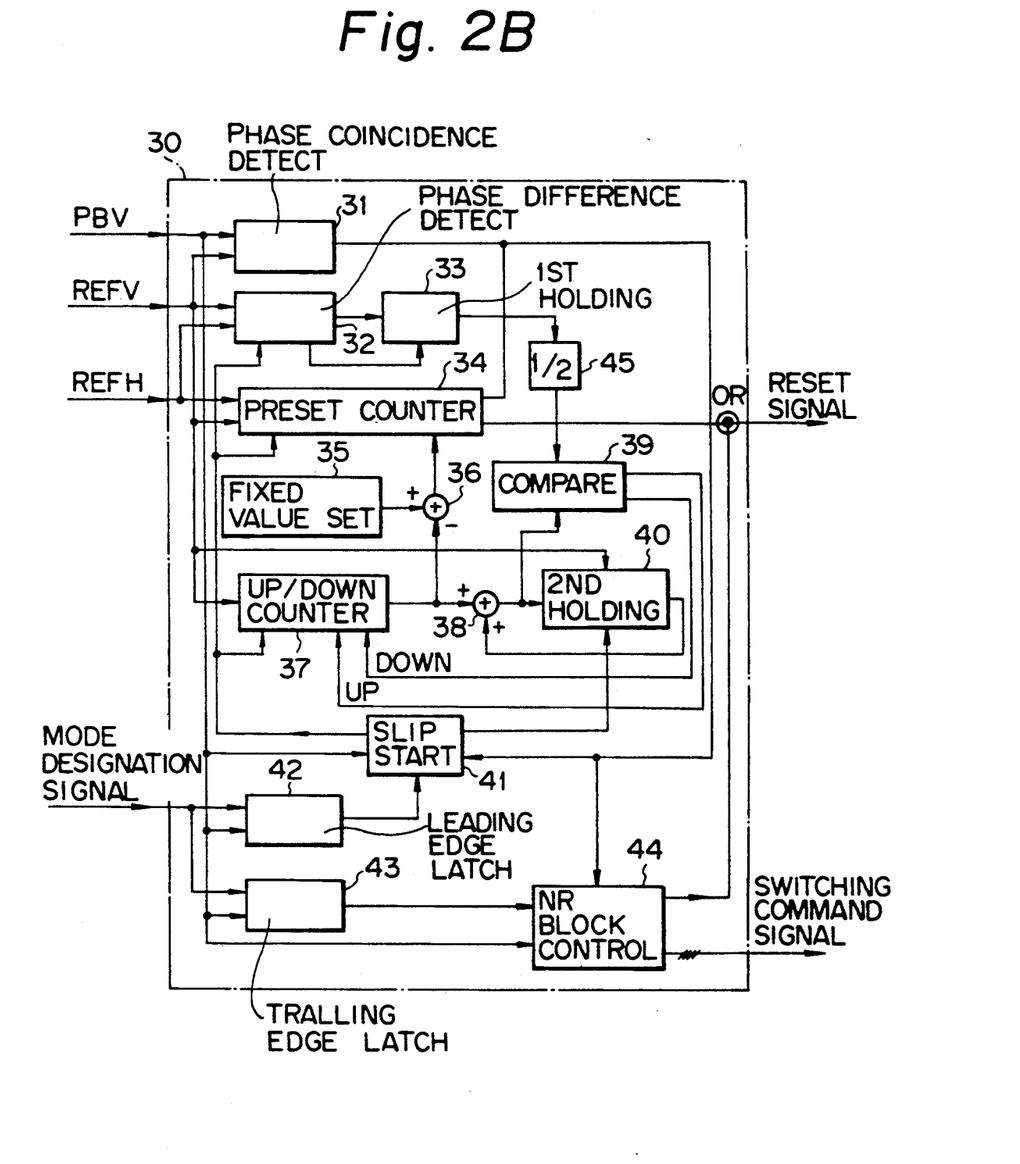
FIG. 2B is a block diagram showing a part of FIG. 2A.

FIG. 2B is a diagram showing an internal construction of the pull-in control circuit 30. In the diagram, the supplied PBV and REFV are supplied to a phase coincidence circuit 31. When the phase difference between them is smaller than a single H-line period, a slip absence signal is output from the phase coincidence circuit 31. A slip start signal synchronized with the PBV as well as the REFV and REFH are supplied to a phase difference detecting circuit 32, by which a phase difference between the PBV and the REFV is detected. The phase difference is represented by the period of REFH as the minimum unit. The operation of the phase difference detecting circuit 32 will be described further in detail with reference to FIG. 2C.

Figure 2C:
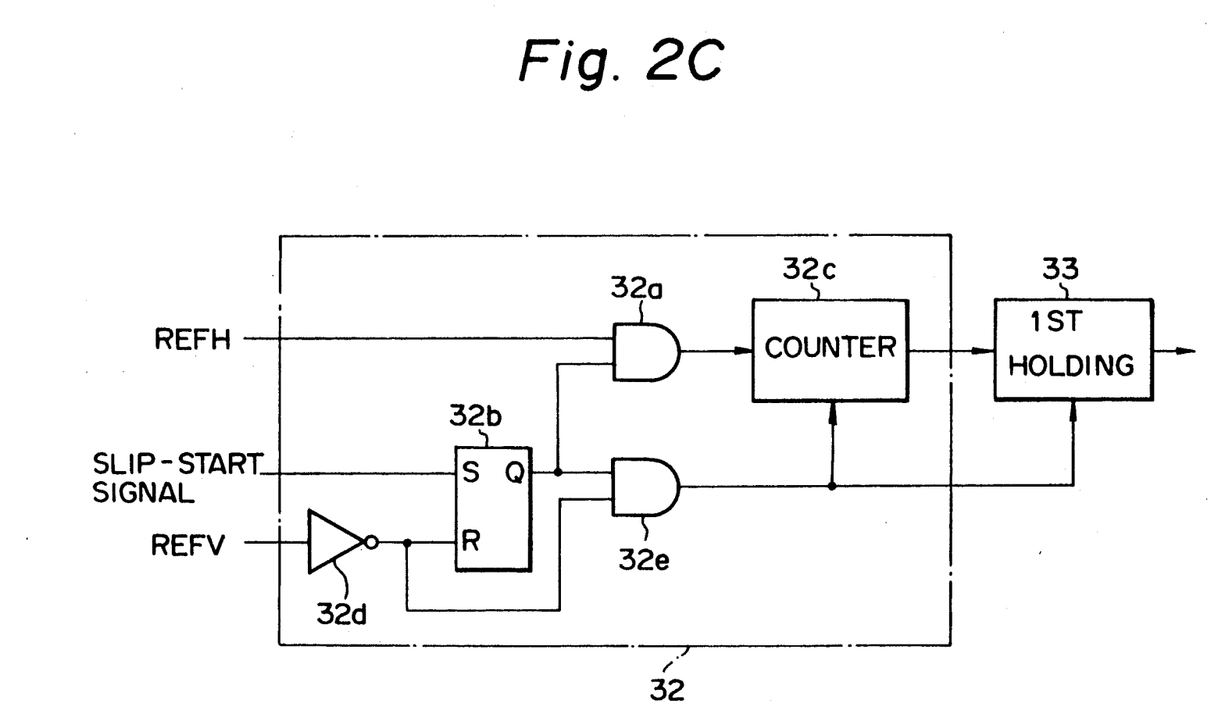
FIG. 2C is a circuit diagram of a part of FIG. 2B.

In FIG. 2C, the REFH is supplied to one input terminal of an AND gate 32a. The slip start signal is supplied as a set signal to an RS flip-flop 32b. An output of the RS flip-flop 32b is supplied to the other input terminal of the AND gate 32a. The AND gate 32a is set into an enable state. The REFH is supplied to a counter 32c, so that the counter 32c starts the counting operation. A count value is supplied to a first holding circuit 33. When the REFV is input, it is inverted by an inverter 32d and is supplied as a reset signal to the RS flip-flop 32b and is also supplied to one input terminal of an AND gate 32e. An output of the RS flip-flop 32b is set to the low level by the inverted input of the REFV through a delay of the propagation time and is supplied to the other input terminal of the AND gate 32e. Therefore, a reset pulse of a time width corresponding to the delay time is supplied to the counter 32c and stops the counting operation.

Now, assuming that the phase difference is set to N number of H lines, the value N is held in the first holding circuit 33 by the reset pulse from the AND gate 32e.

A preset counter 34 counts the supplied number of REFH and outputs a carry-out signal when its count value coincides with a preset value. The carry-out signal is used as a reset signal to be supplied to the signal generator 9.

A fixed value of 263 has been preset in a fixed value setting circuit 35. The fixed value is equal to a value which is obtained by adding an offset value 1 to 262 as the number of scanning lines of one field of the NTSC system (although it is accurately 262.5, 262 is used here for convenience of explanation). The fixed value is supplied to one input terminal of a subtracter 36 and an output of an up/down counter 37 is supplied to the other input terminal. Since the subtracter 36 subtracts a count value of the up/down counter 37 from the fixed value (263) and outputs the resultant value, an output of the subtracter 36 is supplied to the preset counter 34 as a preset value which changes depending on the count value of the up/down counter.

Therefore, as mentioned above, when the carry-out signal from the preset counter 34 is supplied as a reset signal to the signal generator 9, the number of REFH signals appearing between the neigboring two REFV pulses which are output from the signal generator 9 changes in accordance with an increase or decrease in count value of the up/down counter 37. On the other hand, the count value is supplied to one input terminal of an adder 38 and an output of a second holding circuit 40 is supplied to the other input terminal of the adder 38. An output of the adder 38 is supplied to an input terminal of the second holding circuit 40 and is input at a timing of the REFV and is integrated and held. The output of the adder 38 which changes every field is also supplied to a comparing circuit 39.

The PBV which is supplied to a slip start circuit 41 is also supplied to a leading edge latch circuit 42 and a trailing edge latch circuit 43. A signal which is set to the high level in the noise reducing mode and is set to the low level in the special reproducing mode is supplied from the system controller 8 to the latch circuits 42 and 43 while produces signals synchronized with the PBV. The output signal of the trailing edge latch circuit 42 is supplied to the slip start circuit 41 as a switching signal causing change of mode from the special reproducing mode to the noise reducing mode. Upon reception of the mode switching signal, the slip start circuit 41 gives a slip-start signal to the phase difference detecting circuit 32, preset counter 34, and up/down counter 37 and also gives a holding reset signal to the second holding circuit 40.

The output value N of the first holding circuit is transmitted through a half value circuit 45, so that the half value N/2 is supplied to the comparing circuit 39. The comparing circuit 39 compares the integration value of the count values of the up/down counter 37 and the half value. When the count value is equal to or less than the half value, the comparing circuit 39 gives an upcount command signal to the up/down counter 37, thereby increasing the count value in response to the respective REFV pulses applied thereto. If the integration value is equal to or larger than the half value, the comparing circuit 39 produces a down-count command signal in substitution for the up-count signal. Then, the up/down counter 37 produces the same count value as that in the preceding field. Then, the up/down counter 37 actually start the down-count operation from the next field, thereby decreasing the count value one by one. The above processing state will now be described further in detail with reference to tables of FIGS. 3A, 3B, and 3C.

Figure 3A:
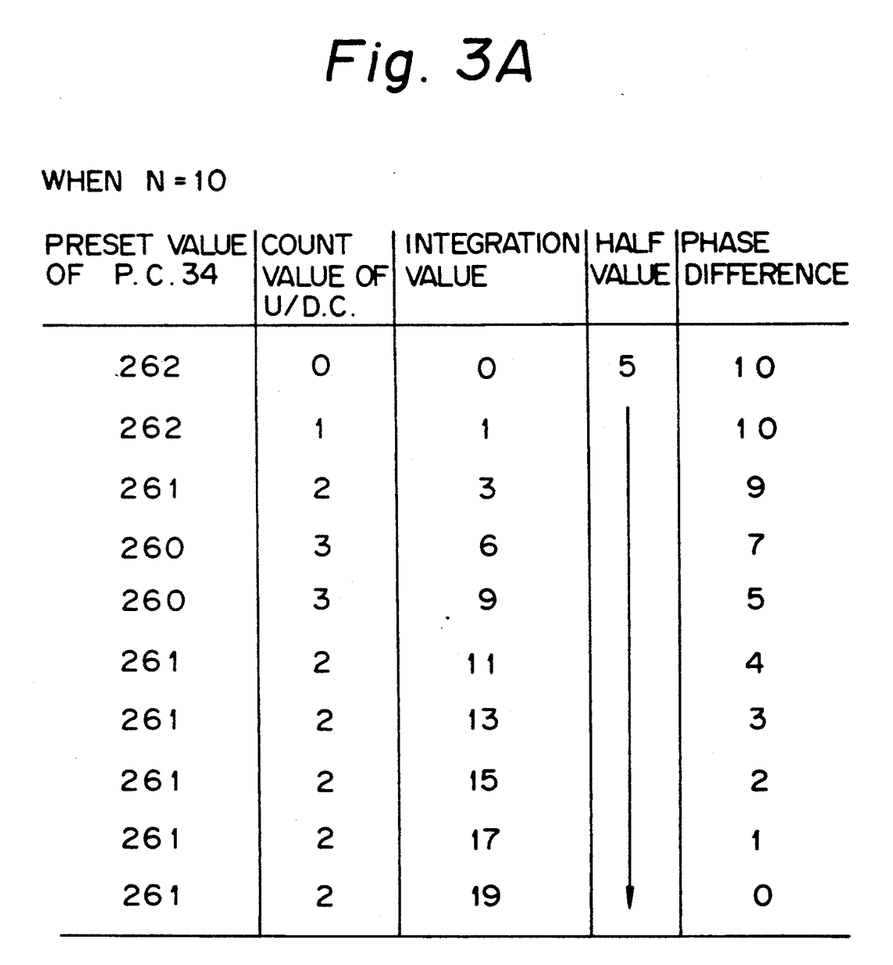
FIGS. 3A and 3B show tables for explaining the operations in the embodiment of the invention.

FIG. 3A shows changes in a number N and a number of REFH pulses appearing between one REFV and a REFV appearing succeedingly to the preceding REFV while the number N represents the phase difference N which is equal to a number of H line periods between the REFV and the PBV. The signal generator 9 oproduces 262 number of REFH during a period between two REFV pulses, which number is equal to the number (262) of PBH pulses appearing between the neigbouring PBV pulses.

Figure 4A:
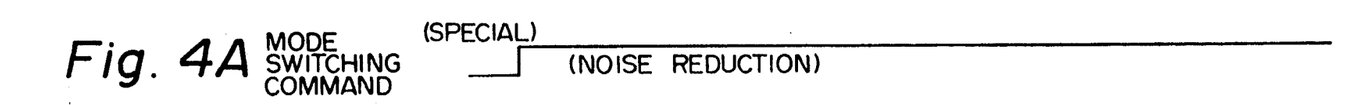
FIGS. 4A through 4J are timing charts of the embodiment of the invention.
Figure 4B:
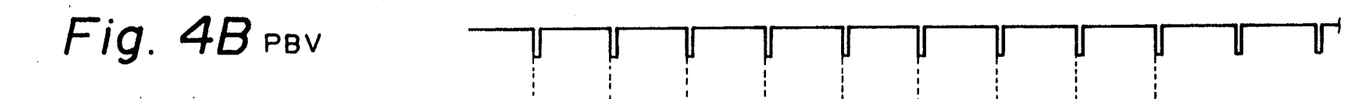
Figures 4C, 4D:
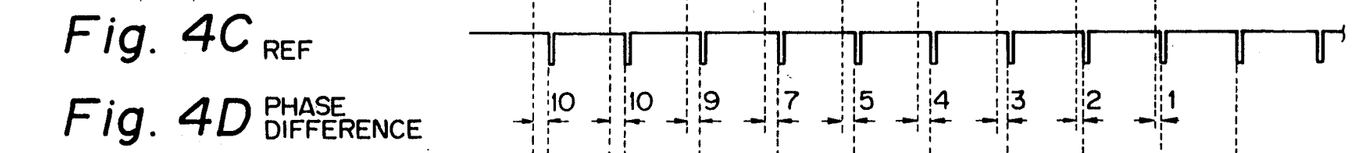
Figure 4E:
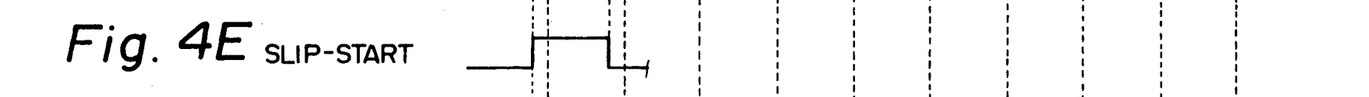
Figure 4F:
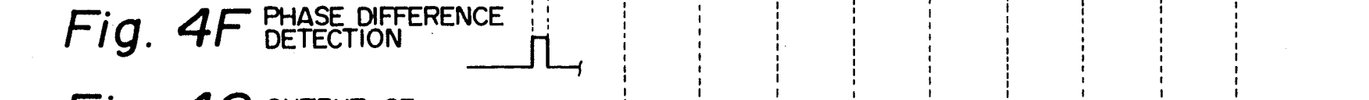
Figures 4G, 4H:
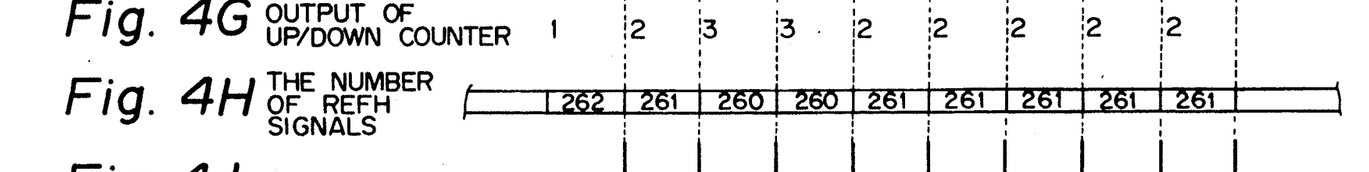
Figure 4I:
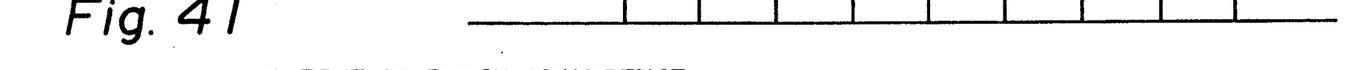
Figure 4J:
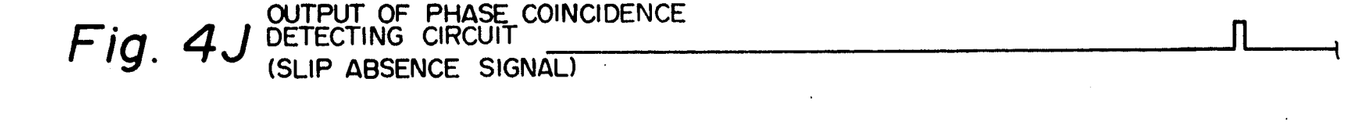

When, in operation, the PBV pulse is supplied to the phase coincidence detection circuit 31 of the pull-in control circuit 30, the phase coincidence detection circuit 31 supplies a dissidence signal to the slip start circuit 41 since those PBV and REFV pulses are different in phase by ten number of H-line periods, in this istance. When, under this condition, the designated mode is changed from the special reproduction mode to the noise reduction mode as shown in FIG. 4A, the leading edge latch circuit 42 supplies a change detection signal to the slip-start circuit 41. Thus, the slip-start citrcuit 41 supplies the slip-start signal (FIG. 4D) to the phase difference detection circuit 32, the preset counter 34 and up/down counte 37. The phase difference detection circuit 32 immediately starts counting the REFH pulses until the appearance of the succeeding REFV pulse as seen from FIG. 4F. Since, in theis instance, the phase difference detection circuit 32 counts ten numbe of REFH pulses which count value is supplied via the hold circuit 33 to the comparing circuit 39. Then, the comparing citcuit 39 produces the up-count signal which is supplid to the up/down counter 37, so that the count value is set to 1 by counting a REFV pulse appearing thereafter. The preset value which is obtained by subtracting the count value "1" from the fixed value (263 in this case) is supplied to the preset counter 34. Therefore, in this case, 263−1=262 and the preset counter 34 gives a reset pulse to the signal generator 9 when the count value of the REFH is equal to 0 by counting 262 number of REFH.

The above processes will now be described with respect to an example in the case of N=10 while referring to FIG. 3A. When the integration value becomes a value of six which is larger than the half value of five, the increasing operation is stopped when the count value of the up/down counter 37 is equal to 3. In the next field, the count value is not changed but held to 3. In the further next field, the count value is decreased to 2. Therefore, the preset value is equal to the difference between the fixed value (263) and the output value of the up/down counter 37 and changes such that 262 →261→260→261. The up/down counter 37 is arranged to stop its count operation when its count value becomes a value of two during the down count mode thereby to hold the count value at the value of two. When the phase difference becomes smaller than a single H-line period, a slip absence signal is produced from the phase coincidence detecting circuit 31, the preset counter 34 and the slip start circuit 41 are reset, and the pull-in operation is finished. After the completion of the pull-in operation, the reset signal from the preset counter 34 does not appear and the signal generator 9 is automatically set into the self-running mode. As mentioned above, when shifting from the special reproducing mode to the noise reducing mode, the pull-in control circuit 30 starts the pull-in operation and decreases the integration value one (H lines) by one every field. When the phase difference is equal to a value near the half value of the initial phase difference N, the count value of the up/down counter 37 is contrarily increased one (H lines) by one. When the phases almost coincide, and the phase difference is, for example, smaller than 1H period the pull-in operation is finished. FIGS. 4A through 4J are timing charts showing the pull-in operation of FIG. 3A performed by the system of FIGS. 2A and 2B.

Figure 3B:
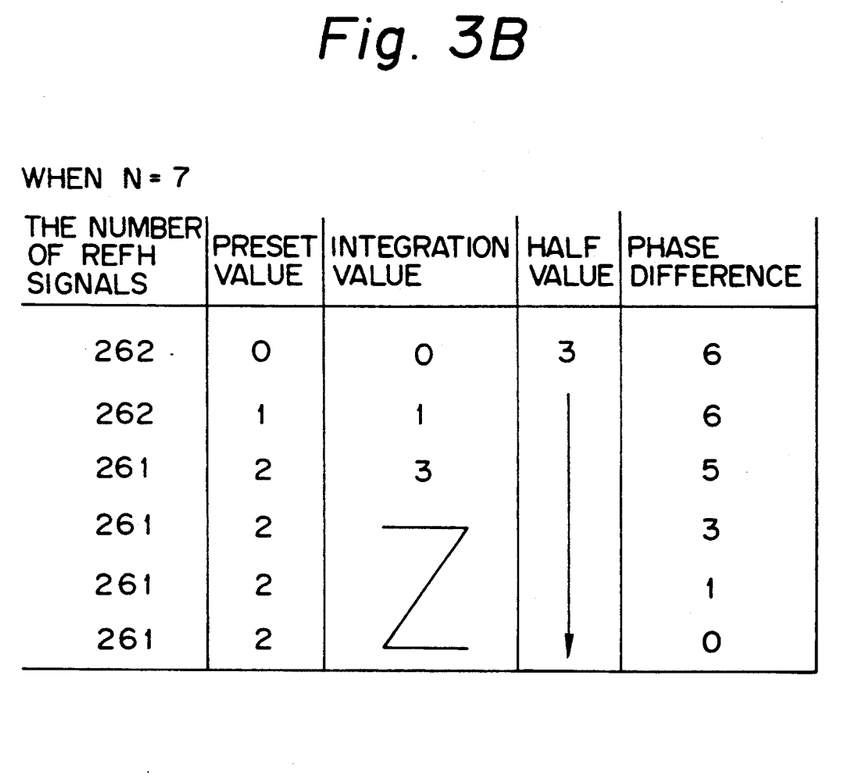

FIG. 3B shows an example in the case of N=6. In this example, when the integration value reaches the half value (a value of 3), the up-counting operation is stopped. It is to be understood that the integrating operation is stopped when the integration value is equal to or larger than the half value, since there is no need to execute the integration.

A special reproducing mode signal from the trailing edge latch circuit 43, the slip absence signal from the phase coincidence detecting circuit 31, and the PBV from the time base correcting circuit 6 are supplied to an NR block control circuit 44 which then produces a switching command signal for changing the present mode to the noise-reduction mode to the system controller 8. On the other hand, the NR block control circuit 44 produces a reset signal. The wired OR between the above reset signal and the reset signal from the preset counter 34 is calculated and the resultant signal is supplied to the signal generator 9.

Figure 5:
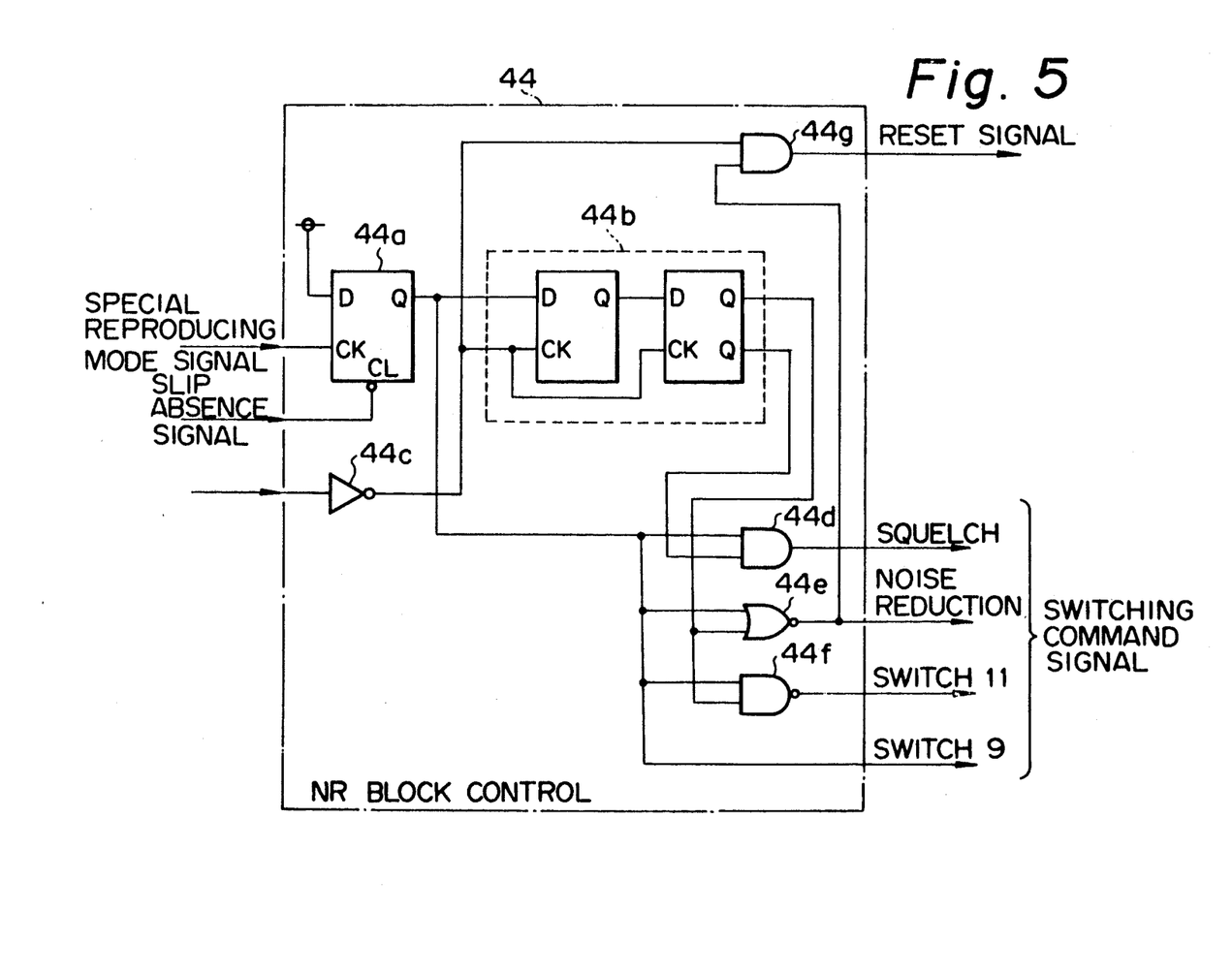
FIG. 5 is a circuit diagram showing a part of FIG. 2B.

FIG. 5 shows an internal circuit of the NR block control circuit 44. In the diagram, when the special reproducing mode signal is supplied from the trailing edge latch circuit 43, a flip-flop circuit 44a outputs a high level signal. When the slip absence signal is supplied, the flip-flop circuit 44a outputs a low level signal. Since the two input signals are synchronized with the PBV as mentioned above, the flip-flop 44a outputs a signal which is synchronized with the PBV and indicates that the special reproducing process is being executed (hereinafter, such a signal is referred to as a trick signal) and supplies to a delay circuit 44b and gate circuits 44d, 44e, and 44f. The input PBV signal is inverted by an inverter 44c and is given to the delay circuit 44b. The delay circuit 44b outputs the trick signal which was delayed by a time of two fields and an inverted trick signal and supplies to the gate circuits 44d, 44e, and 44f.

When, therefore, when the operating mode is switched from the noise reducing mode to the special reproducing mode, the gate circuit 44d outputs a squelch signal for a period of two fields. Similarly, the gate circuit 44f delays the switching signal to the special reproducing mode to the switch 11 by a time of two fields and outputs. On the other hand, the gate circuit 44e delays the switching signal by a time of two fields and outputs a noise reduction mode on signal when the operating mode is contrarily switched from the special reproducing mode to the noise reducing mode. The trick signal itself is output as a switching signal to the switch 19.

As mentioned above, four kinds of switching command signals are output from the NR block control circuit 44 and supplied to the system controller 8. The system controller 8 executes the mode switching control according to the switching command signal in cooperative with the memory controller 7.

On the other hand, an output of the inverter 44c and an output of the gate circuit 44e are supplied to a gate circuit 44g. During the noise reducing operation, the gate circuit 44g outputs the inverted PBV signal as a reset signal and supplies to the signal generator 9.

FIG. 6 is a diagram showing an operational sequence of the NR block control circuit 44.

Figure 7A:
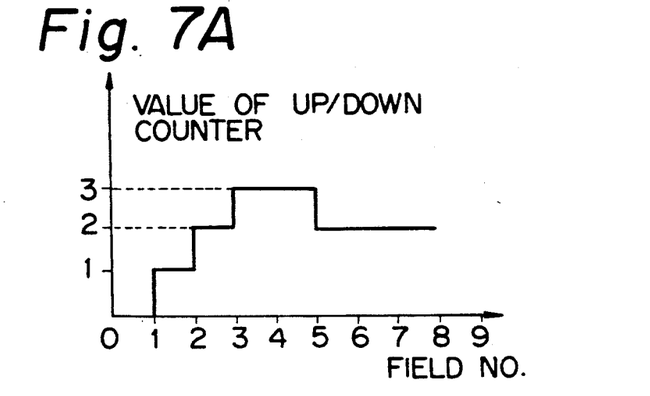
FIGS. 7A, 7B, and 7C are graphs showing change examples of a generation interval of a reference vertical sync signal in the embodiment of the invention.

FIG. 7A shows an increase/decrease change in the count value of the up/down counter 37 for every field in the embodiment. On the other hand, the increasing/decreasing method is not limited to the method of increasing or decreasing one (H lines) by one every field but a plurality value (H lines) can be also increased or decreased every field unless a displayed image unnaturally change.

In the embodiment, although the memory 21 has been used as means in the noise reducing mode, the memory 21 can be also used as means for compensating a signal dropout or producing a still image or the like.

Figure 7B:
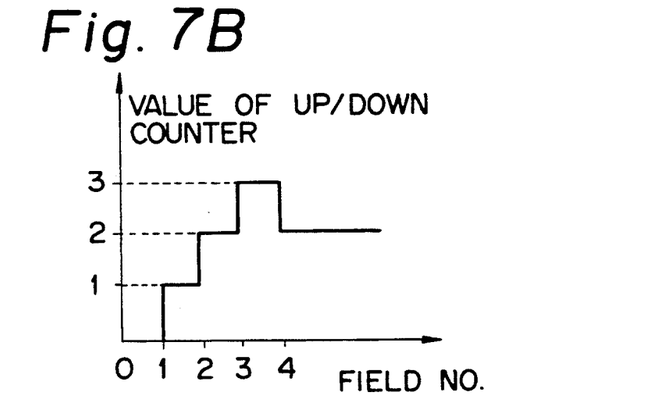

FIG. 7B show a manner of change of the count values of the up/down counter 37 when the up/down counter 37 is so arranged as to start down-counting from the next REFH after its receipt of the down count command signal.

Figure 7C:
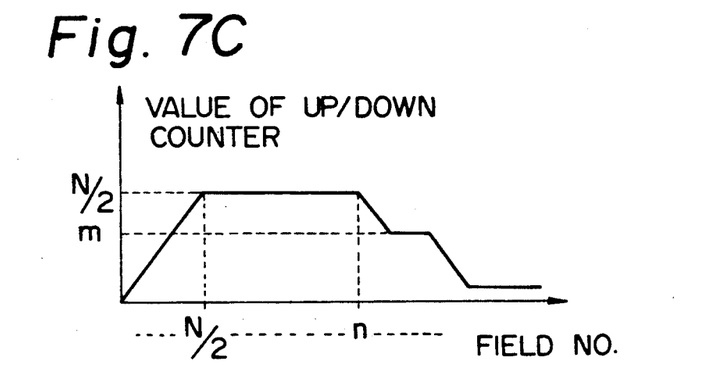

FIG. 7C shows another manner of change of the count value of the up/down counter 37 when the comparing circuit 39 produces the down count command signal N/2 number of fields after the appearance of the slip start signal and the up/down counter 37 is is so arranged as to start down-counting upon appearances of (n−N/2) number of REFV pulses from the reciept of the down-count command signal and furthermore as to have an interruption ofthe down-counting when the count value thereof becomes a value of m. It is to be understood that the count value of the up/down counter 37 discontinuously at the down count mode, in this case.

Furthermore, the up/down counter 37 may be arranged as to interrupt its up-counting when its count value reaches a predetermined value under its up-count mode, thereby to make discontinuous the changing manner of the generation period of those reset signal for resetting the signal generator 9.

In the embodiment, the generation period of the reference vertical sync signal is reduced and then extended. However, it is possible to reduce the generation period after extension thereof.

As described above, in the video signal recording medium playing apparatus according to the invention, when switching from the normal reproducing mode to the special reproducing mode, the phase difference between the reproduction vertical sync signal and the reference vertical sync signal is detected, and if the phase difference is out of the predetermined range, when the video signal is read out of the field memory on the basis of the reference vertical sync signal, the generation period of the reference vertical sync signal is gradually reduced or increased, and after it was reduced or increased, the generation period is again increased or reduced, and when the phase difference lies within the predetermined range, the reproducing mode is switched. Therefore, a fluctuation of the reproduced image upon switching of the reproducing mode can be eliminated.

What is claimed is:

1. A video signal recording medium playing apparatus comprising:

reading means for driving a recording medium on which a video signal has been recorded, for reading out said video signal and demodulating, and thereafter for digitalizing said video signal into a train of pixel data;

memory means which can store the pixel data of at least one field of said video signal;

signal generating means for generating reference horizontal and vertical sync signals in accordance with a reset signal;

first control means for sequentially writing a present value of said pixel data into said memory means and correcting said present value by the corresponding pixel data preceding to said present value by one field period in a normal reproducing mode, and for reading out the pixel data of at least one field from said memory means on the basis of said reference horizontal and vertical sync signals in a special reproducing mode;

second control means for controlling a mode switching of the first control means in accordance with a mode designation command; and output means for converting the digital video signal which is obtained from said first control means into the analog video signal, wherein said second control means comprises:

first detecting means for detecting a phase difference between a reproduction vertical sync signal which is obtained from the video signal just after the mode designation command is generated and the reference vertical sync signal;

second detecting means for producing a phase coincidence signal when said phase difference lies within a predetermined range;

pull-in means for gradually reducing or increasing a generation interval of the reset signal when the phase coincidence signal is absent, for thereafter gradually increasing or reducing the generation interval, for producing the reset signal, and for executing a vertical pull-in control; and switching instructing means for instructing the mode switching to the first control means in response to said phase coincidence signal during said vertical pull-in control.

2. An apparatus according to claim 1, wherein the pull-in control means changes the generation interval of the reset signal by a unit of at least a 1H line period of the read video signal.

3. An apparatus according to claim 1, wherein the pull-in control means continuously increases or reduces the generation interval of the reset signal.

4. An apparatus according to claim 1, wherein the pull-in control means discontinuously increases or reduces the generation interval of the reset signal.

* * * * *